United States Patent
Chu

(10) Patent No.: US 7,266,069 B2
(45) Date of Patent: Sep. 4, 2007

(54) METHOD AND APPARATUS FOR RETRY CALCULATION IN AN OPTICAL DISK DEVICE

(75) Inventor: Sherlock Chu, Taipei (TW)

(73) Assignee: Via Technologies, Inc.,, Taipei (TW)

( * ) Notice: Subject to any disclaimer, the term of this patent is extended or adjusted under 35 U.S.C. 154(b) by 757 days.

(21) Appl. No.: 10/772,402

(22) Filed: Feb. 6, 2004

(65) Prior Publication Data
US 2005/0188244 A1    Aug. 25, 2005

(51) Int. Cl.
*G11B 7/00*    (2006.01)
(52) U.S. Cl. ............................... 369/53.35; 369/53.15; 714/769
(58) Field of Classification Search ...................... None
See application file for complete search history.

(56) References Cited
U.S. PATENT DOCUMENTS 6,378,103 B1 *   4/2002   Han ............................ 714/769
6,490,236 B1    12/2002   Fukuda et al.
7,149,167 B2 *  12/2006   Hayashi et al. .......... 369/47.34

* cited by examiner

*Primary Examiner*—Tan Dinh
(74) *Attorney, Agent, or Firm*—Rabin & Berdo, P.C.

(57) ABSTRACT

A method for determining a maximum number of attempted retry operations when a read error occurs in an optical disk device. The method includes the steps of receiving an RF signal from a pickup of the optical disk device, detecting an envelope of the RF signal, asserting a defect signal when a level of the envelope is lower than a predetermined threshold, generating interrupt pulses during the assertion of the defect signal, and determining the maximum number of attempted retry operations using the interrupt pulses.

18 Claims, 3 Drawing Sheets

METHOD AND APPARATUS FOR RETRY CALCULATION IN AN OPTICAL DISK DEVICE

BACKGROUND OF THE INVENTION

1. Field of the Invention

The present invention relates to data access in an optical disk device and in particular to a method and apparatus for determining a maximum retry count in an optical disk device.

2. Description of the Prior Art

Since CD-ROM drives typically access data at high speed such as 16X or 24X, read errors are likely to occur. Read errors result from a low signal-to-noise ratio (SNR) in the read signal, which hinders accurate detection of the data. CD-ROM drives typically execute retry operations when a data block recorded on the disk is unrecoverable during an initial read operation. Because the magnitude and character of the noise during any given read operation can vary, rereading the data block during retry operations may result in at least one read operation where the SNR is high enough to accurately recover the data block. Thus, numerous retry operations may be required to successfully recover the data block. Numerous reties result in increased latency as the CD-ROM drive can only retry once per disk revolution. Furthermore, the SNR may never be high enough to enable recovery of the data block regardless of the number of retries, which means the data block is permanently lost.

Conventional methods for the read retry operation are described in the following. A first general method retries for a predetermined number of times under the condition that the number of disk revolutions per unit time (i.e., disk revolution rate) is maintained at a given level. A second method temporarily decelerates the disk to retry if the error has not been corrected by the first general method, and accelerates to the original disk revolution rate if the read attempt is successful. A third method decelerates the disk to retry if the error has not been corrected by the first general method, and maintains the revolution rate at the decreased level if the read operation is successful.

The previous read retry methods have respective advantages and disadvantages. The first general method exhibits low error correction capability because the disk revolution rate is always maintained at a given level. The second method of temporary deceleration is superior in its error correction capability, but increases the load on the system. That is, the revolution rate of a spindle motor is frequently altered, due to the above method. The second method may also damage the disk because the disk returns to the original revolution rate after an error is corrected. Typically, the disk is damaged due to the abrupt changes in the revolution speed of the disk. The damaged region of the disk may generate further read errors and thus increases difficult in deciphering data in the error-prone region. The third method of deceleration lowers the data transmission rate due to the decreased disk revolution rate being maintained after an error occurs.

For disks on which digital audio data is recorded, in a playback mode, data read by the pickup of the CD-ROM drive is temporarily written in a buffer to be processed by a decoder. The decoded data in the buffer is then erased from the buffer. For smooth audio playback without interruption, the number of retries attempted must be limited so that the retry operation stops before a new data read operation is executed. The next block will be read regardless of errors when the data buffer is empty.

In Digital Audio Extraction ("DAE"), also known generally as "ripping", wherein an audio track is copied from the disk to a hard drive or other storage medium by creating a file (or group of files) in any number of encoded and/or compressed formats (e.g., WAV, MP3, etc.), the number retries attempted must be large enough to replicate the data on the disk as accurately as possible.

In the previously described methods for read retry operations, however, the number of retries is fixed. Hence, it is impossible for firmware designers to identify a number of retries sufficient both for playback and extraction of audio from a disk.

SUMMARY OF THE INVENTION

The present invention provides both a method and an apparatus for retry calculation in an optical disk device, optimal for both audio playback and extraction.

The present invention provides a method for determining a maximum number of attempted retry operations when a read error occurs in an optical disk device. The method includes the steps of receiving an RF signal from a pickup of the optical disk device, detecting an envelope of the RF signal, asserting a defect signal when a level of the envelope is lower than a predetermined threshold, generating interrupt pulses during the assertion of the defect signal, and determining the maximum number of times the retry operation is attempted using the interrupt pulses.

The present invention also provides an apparatus for determining a maximum number of attempted retry operations when a read error occurs in an optical disk device. The apparatus includes an RF signal processor for receiving and amplifying an RF signal from a pickup of the optical disk device, an envelope detector for outputting an RF signal envelope, a defect detector for asserting a defect signal when an envelope level is lower than a predetermined threshold and for generating interrupt pulses during the assertion of the defect signal, and a system controller for determining the maximum of times the retry operation is attempted using the interrupt pulses.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
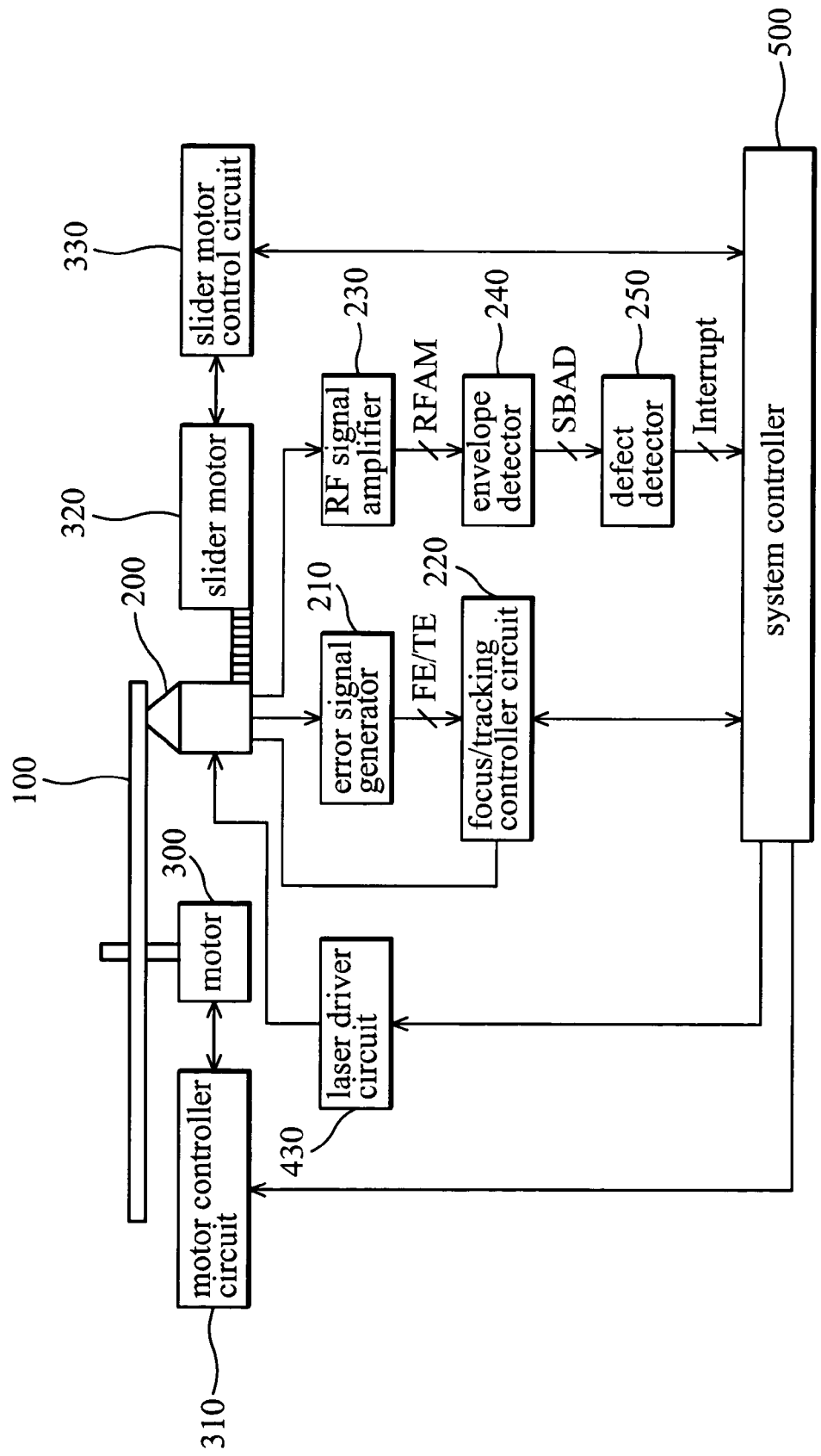
FIG. 1 is a block diagram of an optical disk device according to one embodiment of the invention.

FIG. 1 is a block diagram of an optical disk device according to one embodiment of the invention. In FIG. 1, an optical disk 100 could be a high-density information recording medium. An optical head 200 could be internally equipped with a semiconductor laser used for recording or playback, various types of lenses, a photo-detector, and the like.

In this embodiment, information is recorded to or played back from the optical disk 100. Accurate focusing and tracking is provided by having a focus/tracking control circuit 220 directing an object lens (not shown in the figure) based on a focus/tracking error signal FE/TE from an error signal generator 210. A system controller 500 issues instructions for various offsets for the optical head 200, land/groove switching, and the like.

The RF signal amplifier 230 amplifies an RF analog signal transmitted from the optical head 200 to a predetermined level and outputs a signal RFAM. The amplified RF signal RFAM is sent to an envelope detector 240 generating an envelope signal SBAD of the amplified RF signal RFAM.

The defect detector 250 outputs a signal Interrupt. When a level of the envelope signal SBAD drops below a predetermined threshold, a signal DEF (not shown) in the defect detector 250 is asserted until the level of the envelope signal SBAD exceeds the threshold. The signal DEF is periodically detected at a predetermined time interval. For each detection, an interrupt pulse is generated in the signal Interrupt if assertion of the signal DEF is detected. Alternatively, for each detection, the interrupt pulse is only generated if a level transition is detected in the signal DEF.

The device of this embodiment could further include a disk rotation motor 300, a motor controller circuit 310, and a slider motor 320 for moving the optical head 200, and a slider motor controller circuit 330. These elements are all controlled by the system controller 500, and all are a portion of the well-known disc player.

Figure 2:
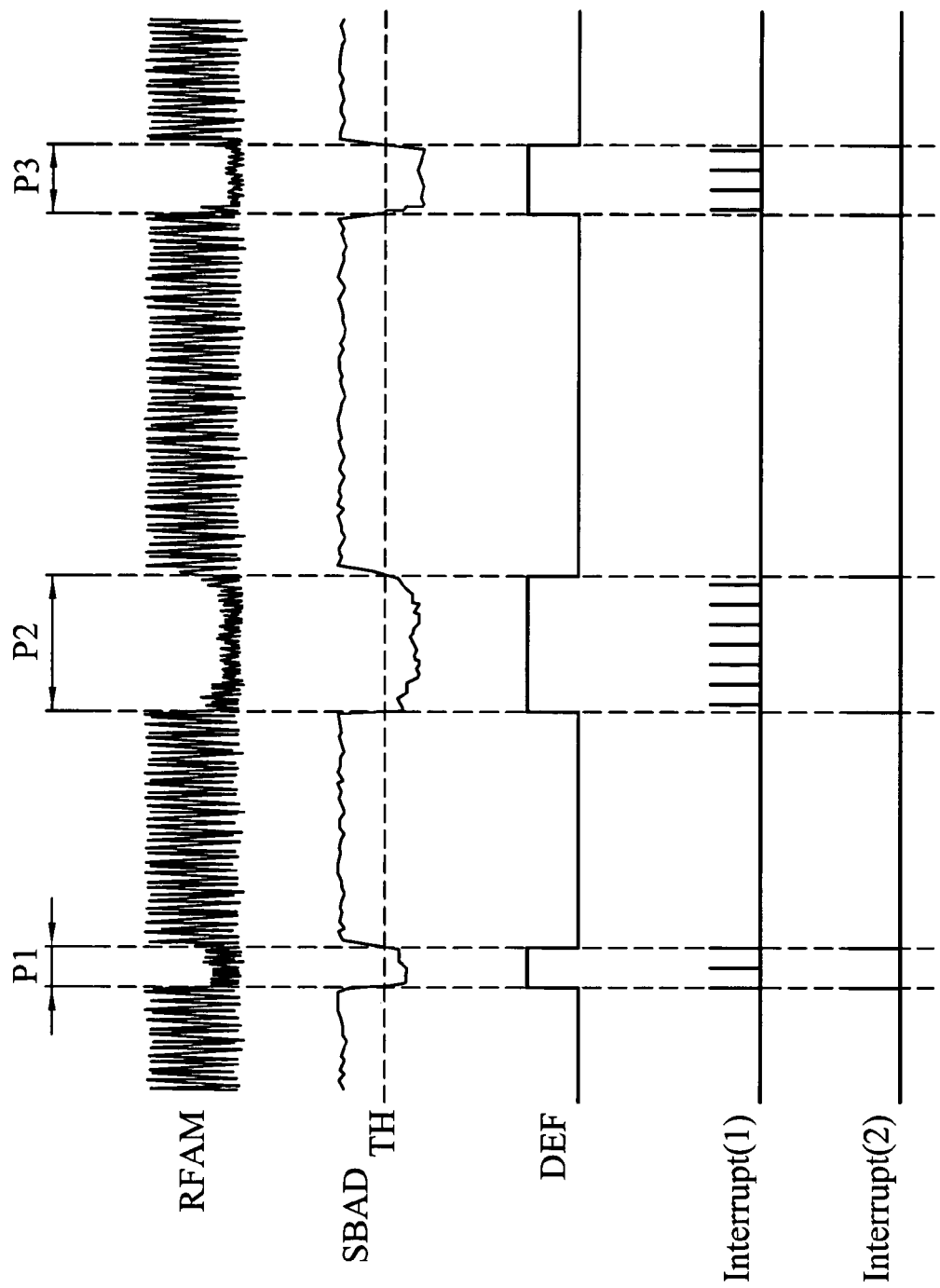
FIG. 2 shows waveforms of the signals RFAM, SBAD, DEF and Interrupt in the optical disk device shown in FIG. 1.

FIG. 2 shows waveforms of the signals RFAM, SBAD, DEF and Interrupt. The waveform of the signal RFAM is derived by reading one of the data blocks on the disk. It is noted that the RF signal drops during three periods P1, P2 and P3 due to data errors, disc defects, and so on. Thus, the envelope signal SBAD also drops in the periods P1, P2 and P3. In each of the periods P1, P2 and P3, the signal DEF is asserted (pushed up) when the level of the signal SBAD is lower than a threshold level TH, which could be a predetermined value, and de-asserted (pulled down) when the level of the signal SBAD exceeds the threshold level TH. Interrupt pulses are periodically generated during the periods P1, P2 and P3, as shown by the waveform Interrupt (1). Alternatively, the interrupt pulses are only generated upon level transitions of the signal DEF, as shown by the waveform Interrupt (2). Further, it should be noted that the key-point is how many interrupt pulses exist in a period. In other words, both the distribution and the shape of the exiting interrupt pulses are not the key-points.

Figure 3:
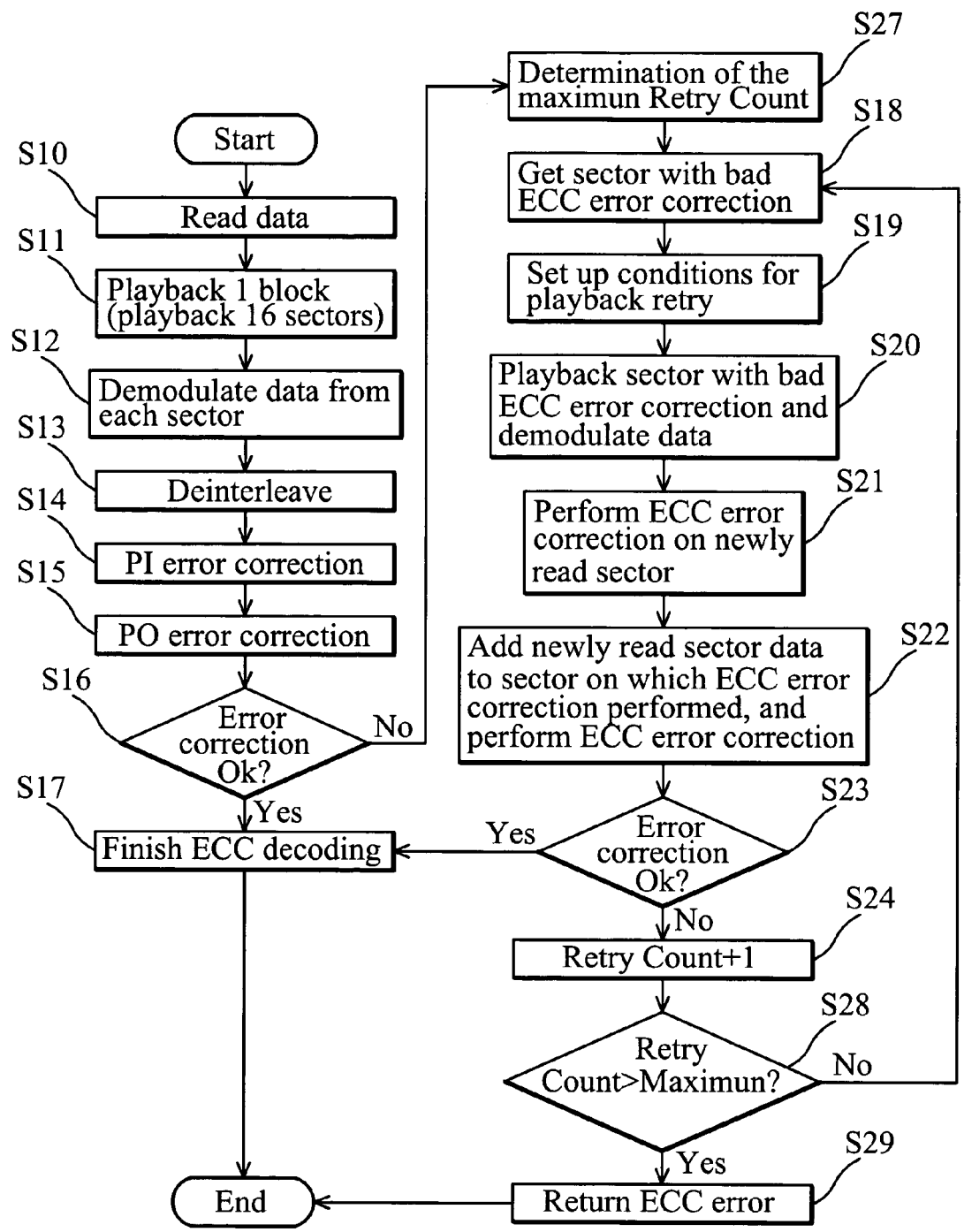
FIG. 3 is a flowchart showing a method for determining the maximum number of attempted retry operation when a data error occurs in the optical disk device shown in FIG. 1.

FIG. 3 is a flowchart showing a method of determining the maximum number of attempted retry operations when a data error occurs in the optical disk device shown in FIG. 1.

Retrieving data from the optical disk 100 involves reading ECC blocks, so one ECC block (i.e., 16 sectors) is played back (step S11). Next, data is demodulated from each sector (step S12) by a demodulator (not shown in FIG. 1). After deinterleaving (step S13), ECC error correction including P1 error correction (step S14) and P0 error correction (step S15) is implemented. If the ECC error correction is OK, ECC decoding is complete (step S17), and the next step for reading the main data and the ID data can be performed.

If step S16 determines that error correction cannot be performed, the sector out of the 16 sectors for which ECC correction could not be performed is extracted (step S18).

In step S27, the system controller 500 selects one of three values RC1, RC2 and RC3 to be the maximum value of a parameter Retry Count according to the signal Interrupt having periodical pulses. The system controller 500 counts the total number N of interrupt pulses in the signal Interrupt within a read period of the error block. RC1, RC2 and RC3 are selected respectively if the number N is larger than a threshold N1, between the threshold N1 and another threshold N2, and lower than the threshold N2, wherein RC1<RC2<RC3 and N1>N2. Put simply, the maximum Retry Count is value large if the number N is small, or small if the number N is large. In other words, the larger the number N is, the smaller the value RC (RC1, RC2, RC3) is.

Alternatively, the system controller 500 may select one of the three values RC1, RC2 and RC3 for the maximum Retry Count according to the signal Interrupt, which pulses only when level transitions occur in the signal DEF. The system controller 500 calculates the total length L of the periods between pairs of an odd and even-numbered interrupt pulses in the signal interrupt within a read period of the error block. RC1, RC2 and RC3 are selected respectively if the length L is larger than a threshold L1, between the threshold L1 and another threshold L2, and lower than the threshold L2, wherein L1>L2. Put simply, the maximum Retry Count value is large if the length L is short, or small if the length L is long.

Next, in step S19, playback retry conditions are set. In a playback retry, if data is not properly played back, the same block on the optical disk is read again. When performing a playback retry, information can be re-read by using the same or modified conditions. If playback conditions are to be changed, the system controller 500 can change focusing conditions or tracking conditions in the focus/tracking control circuit 220. Alternatively, the system controller 500 can alter the speed in the motor control circuit 310.

With one of these playback conditions selected, the sector for which ECC correction was not possible is played back, and data demodulation is performed (step S20). Next, ECC error correction is performed on the newly read sector (step S21). In step S22, the data from the newly read sector is added to the sector data from the previous read for which ECC correction was possible (this data was stored in a memory such as SRAM). At this time, if the ECC error correction for the block is possible, ECC decoding is completed (step S17). If the ECC error correction is not possible in step S23, the Retry Count is increased by an increment such as 1 at step S24.

In step S28, the system controller 500 determines whether the Retry Count has exceeded the maximum selected in step S27. If so, an ECC error is reported by the system controller 500 in step S29. Otherwise, the procedure returns to step S18. In this case, different playback retry conditions will be set in step S19.

Step S27 in the method shown in FIG. 3 also applies to determining the maximum Retry Count for a write retry operation.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for determining a maximum number of attempted retry operations when a read error occurs in an optical disk device, the method comprising the steps of:
   receiving an RF signal from a pickup of the optical disk device;
   detecting an envelope of the RF signal;
   asserting a defect signal when a level of the envelope is lower than a predetermined threshold;
   generating interrupt pulses during the assertion of the defect signal; and
   determining the maximum number of attempted retry operations according to the interrupt pulses.

2. The method as claimed in claim 1, wherein the interrupt pulses are periodically generated at a predetermined time interval during the assertion of the defect signal.

3. The method as claimed in claim 2, wherein the maximum number of attempted retry operations is determined according to a total number of the interrupt pulses within a read period of a data block causing the read error.

4. The method as claimed in claim 3, wherein one of a first, second and third values is selected as the maximum respectively when the total number of the interrupt pulses is larger than a first threshold, between the first and second threshold, and lower than the second threshold.

5. The method as claimed in claim 4, wherein the first threshold is larger than the second threshold, the first value is smaller than the second value and the second value is smaller than the third value.

6. The method as claimed in claim 1, wherein the interrupt pulses are generated only upon level transitions in the defect signal.

7. The method as claimed in claim 6, wherein the maximum of times the retry operation is attempted is determined according to a total length of periods between pairs of odd and even-numbered pulses, within a read period of a data block causing the read error.

8. The method as claimed in claim 7, wherein one of a first, second and third values is selected as the maximum respectively when the total length of the periods is larger than a first threshold, between the first and second threshold, and lower than the second threshold.

9. The method as claimed in claim 8, wherein the first threshold is larger than the second threshold, the first value is smaller than the second value and the second value is smaller than the third value.

10. An apparatus for determining a maximum number of attempted retry operations when a read error occurs in an optical disk device, the apparatus comprising:
    an RF signal processor for both receiving and amplifying an RF signal from a pickup of the optical disk device;
    an envelope detector for outputting an envelope of the RF signal according to the results of the RF signal processor;
    an defect detector for both asserting a defect signal when a level of the envelope is lower than a predetermined threshold and for generating interrupt pulses during the assertion of the defect signal, wherein the defect detector receives the output of the envelop detector; and
    a system controller for determining the maximum number of attempted retry operations according to the interrupt pulses, wherein the system controller receives the output of the defect detector.

11. The apparatus as claimed in claim 10, wherein the interrupt pulses are periodically generated at a predetermined time interval during the assertion of the defect signal and are received by the defect detector.

12. The apparatus as claimed in claim 11, wherein the system controller determine the maximum number of attempted retry operations according to a total number of the interrupt pulses within a read period of a data block causing the read error.

13. The apparatus as claimed in claim 12, wherein one of a first, second and third values is selected as the maximum respectively when the total number of the interrupt pulses is larger than a first threshold, between the first and second threshold, and lower than the second threshold.

14. The apparatus as claimed in claim 13, wherein the first threshold is larger than the second threshold, the first value is smaller than the second value and the second value is smaller than the third value.

15. The apparatus as claimed in claim 10, wherein the interrupt pulses are generated only upon level transitions of the defect signal.

16. The apparatus as claimed in claim 15, wherein the system controller determines the maximum of times the retry operation is attempted according to a total length of periods between pairs of odd and even-numbered pulses, within a read period of a data block causing the read error.

17. The apparatus as claimed in claim 16, wherein one of a first, second and third values is selected as the maximum respectively when the total length of the periods is larger than a first threshold, between the first and second threshold, and lower than the second threshold.

18. The method as claimed in claim 17, wherein the first threshold is larger than the second threshold, the first value is smaller than the second value and the second value is smaller than the third value.

* * * * *